United States Patent
Hegde et al.

(10) Patent No.: US 8,276,195 B2
(45) Date of Patent: Sep. 25, 2012

(54) MANAGEMENT OF SPLIT AUDIO/VIDEO STREAMS

(75) Inventors: Rajesh K. Hegde, Redmond, WA (US); Cha Zhang, Sammamish, WA (US); Philip A. Chou, Bellevue, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/968,194

(22) Filed: Jan. 2, 2008

(65) Prior Publication Data

US 2009/0172779 A1 Jul. 2, 2009

(51) Int. Cl.
- *H04L 9/32* (2006.01)
- *H04N 7/167* (2011.01)
- *G06F 7/04* (2006.01)

(52) U.S. Cl. ............. 726/6; 726/3; 726/4; 726/5; 726/7; 380/210; 380/211; 380/212; 380/213; 380/217

(58) Field of Classification Search ........................ 726/6
See application file for complete search history.

(56) References Cited

U.S. PATENT DOCUMENTS

| | | | |
|---|---|---|---|
| 5,898,441 A | 4/1999 | Flurry | |
| 5,943,064 A | 8/1999 | Hong | |
| 6,389,487 B1 | 5/2002 | Grooters | |
| 6,831,917 B1 | 12/2004 | Cheriton | |
| 6,986,158 B1* | 1/2006 | Terui et al. | 725/116 |
| 7,143,432 B1* | 11/2006 | Brooks et al. | 725/105 |
| 2006/0047750 A1 | 3/2006 | Schmitt et al. | |
| 2006/0050155 A1 | 3/2006 | Ing et al. | |
| 2006/0125922 A1 | 6/2006 | Albert et al. | |
| 2006/0244839 A1 | 11/2006 | Glatron et al. | |
| 2008/0034119 A1* | 2/2008 | Verzunov et al. | 709/247 |
| 2008/0059580 A1* | 3/2008 | Kalinowski et al. | 709/204 |

OTHER PUBLICATIONS

"ArcSoft Magic-i™ 3", http://www.arcsoft.com/products/magici/.
"ManyCam 2.0", http://pcwin.com/Internet/Communications/ManyCam/index.htm.
"WebCam Max",http://www.webcammax.com/.
"WebCamSplitter Pro 1.3.1", Date: Jul. 24, 2007, VerySoft LLC (3 other programs), http://www.soft32.com/download_102468.html.

* cited by examiner

*Primary Examiner* — Longbit Chai

(57) ABSTRACT

Described herein is a method that includes receiving multiple requests for access to an exposed media object, wherein the exposed media object represents a live media stream that is being generated by a media source. The method also includes receiving data associated with each entity that provided a request, and determining, for each entity, whether the entities that provided the request are authorized to access the media stream based at least in part upon the received data and splitting the media stream into multiple media streams, wherein a number of media streams corresponds to a number of authorized entities. The method also includes automatically applying at least one policy to at least one of the split media streams based at least in part upon the received data.

20 Claims, 10 Drawing Sheets

MANAGEMENT OF SPLIT AUDIO/VIDEO STREAMS

BACKGROUND

Video cameras have been conventionally used to create films that are presented to audiences for a fee. As time has passed and technology has evolved, video cameras have become available at the consumer level. Consumers have used video cameras to capture events that are deemed to be memorable, such that the events can be viewed at later times. As technology has still further developed, video captured by a device at a first location can be nearly instantaneously transferred by way of a network to a second location. In a particular example, a first individual can connect a webcam to her computer and capture video of herself and her surroundings. The video can then be made available in real-time to a second individual by way of the Internet, for example.

Conventionally, when a user no longer wishes to share video from a networked video camera (e.g., webcam), the user can perform one of two tasks: (1) shut down the application that is being used to share the video; or (2) power down the hardware (video camera). Currently, however, some applications are required to be constantly executing, and these applications require a video camera to be continuously capturing images. For instance, there are applications that monitor video to detect activity in a particular region associated with a video camera.

As the use of video cameras continues to increase, and as additional applications are configured to access and display video in real-time, concerns regarding who is viewing the video and how the video is being used may arise.

SUMMARY

The following is a brief summary of subject matter that is described in greater detail herein. This summary is not intended to be limiting as to the scope of the claims.

Various technologies relating to managing a media stream are described in detail herein. A media stream may be a video stream, an audio stream, an audio/video stream, or some other suitable media stream. A capture device can create a media stream, wherein the media stream can be desirably viewed in real-time and/or stored for subsequent viewing. For instance, the capture device may be a webcam coupled to a computing device. As video/web conferencing becomes more prevalent, it may be desirable to allow more than one application (at the same time) to access a media stream created by the capture device at the same time. For instance, it may be desirable to allow more than one application to access a live media stream.

In an example, to allow applications/users to receive a live media stream created by the capture device, an object can be exposed, wherein the object represents the media stream. Several applications may then be able to request access to the object such that each application receives a media stream at a substantially similar time. Prior to providing access to a media stream, however, a determination can be made regarding whether a requesting application is authorized to receive the media stream. For example, the determination may be based at least in part upon an identity of the application, an identity of a user that is using the application, a version number of an application, time of day, day of week, a number of applications currently receiving the media stream created by the capture device, etc. Once it is determined that a requesting entity is authorized to receive the media stream, the media stream created by the capture device can be split such that a media stream can be provided to the requesting entity. More specifically, the media stream created by the capture device may be split into several media streams, wherein a media stream is to be provided to each requesting entity that is authorized to receive the media stream.

It may be desirable, however, to apply different policies to media streams that are received by different entities. For instance, it may be desirable to provide a first media stream to a first entity at a first resolution and a second media stream to a second entity at a second resolution. Furthermore, due to privacy concerns (e.g., multiple people having the ability to receive a media stream created by the capture device), it may be desirable to indicate to a person that is being captured in audio and/or video, for example, the number of applications/users that are accessing a media stream from the capture device. Other policies may also be applied to media streams received by the requesting entities. For instance, metadata can be selectively applied to one or more media streams that are received by one or more requesting entities. Furthermore, media content may be modified for a particular media stream. These policies are just a few of the several possible policies that may be applied to a media stream that is provided to a requesting entity.

Other aspects of the present application will be appreciated upon reading and understanding the attached figures and description.

DETAILED DESCRIPTION

Figure 1:
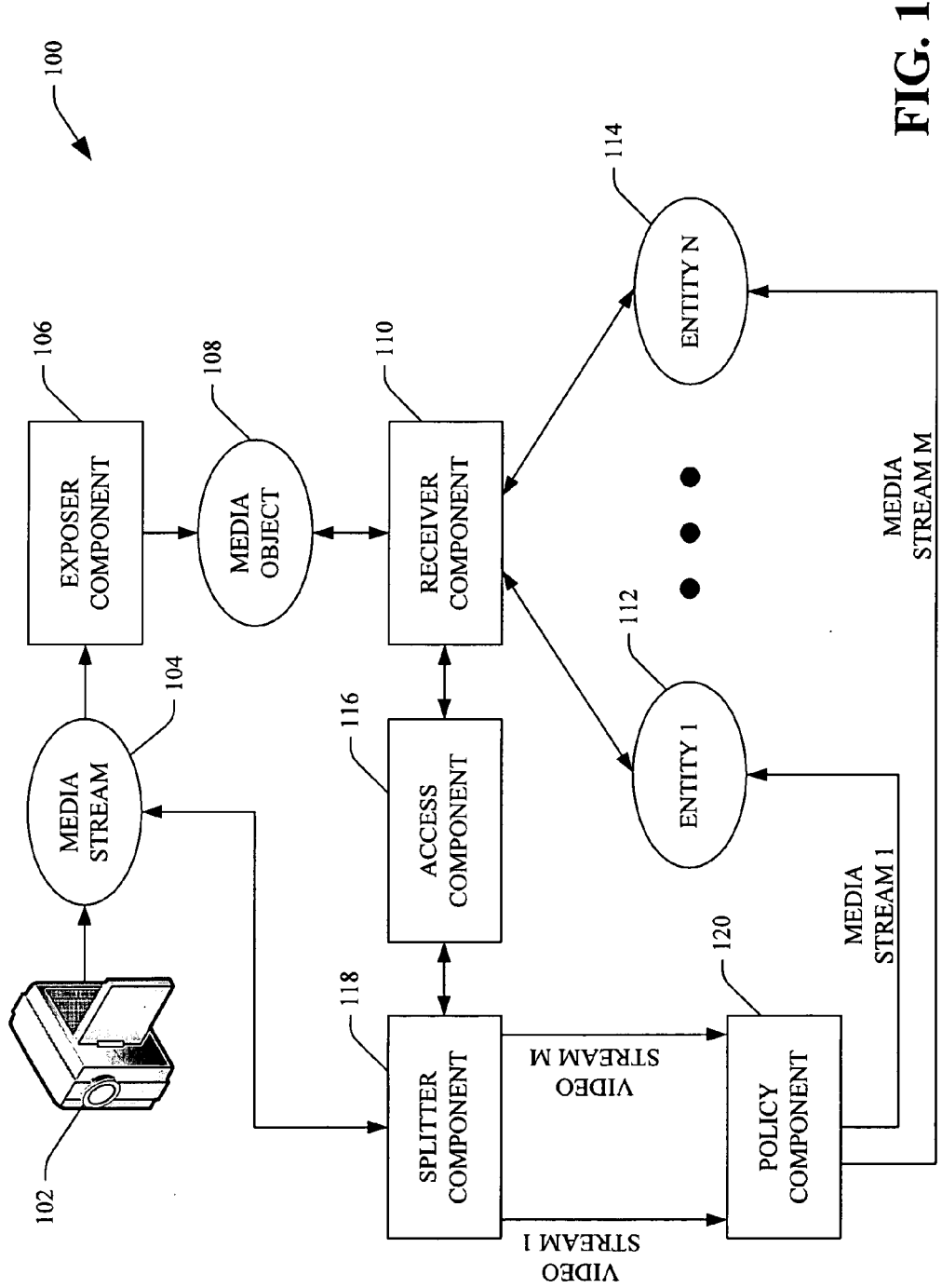
FIG. 1 is a functional block diagram of an example system that facilitates managing media.

Various technologies pertaining to managing media from a media capture device will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple threads of execution. Similarly, for instance, a single thread of execution may be configured to perform functionality that is described as being carried out by multiple components.

Further, for ease of explanation the following example systems and methods are described with respect to management of video. It is to be understood, however, that the example systems and methods may be configured to perform management of any suitable media stream, including video, audio, and/or audio/video streams.

With reference to FIG. 1, an example system 100 that facilitates managing media is illustrated. The system 100 includes a media capture device 102 that generates media frames (e.g., video frames) in real-time (e.g., a video stream 104). For instance, the media capture device 102 can be or include a webcam, a digital video camera, a microphone, a conversion mechanism that converts analog audio/video data to digital audio/video data, etc. An exposer component 106 exposes the media stream 104 as a media object 108, such that the media object 108 represents the media stream 104 produced by the media capture device 102. For instance, the media object 108 may be an icon that is selectable by a user, wherein selection of the media object 108 by the user is an indication of a request for receipt of the media stream 104. In an example, the media object 108 can represent a live video stream. In another example, the media object 108 can represent a video stream that has been previously created and is stored in a data repository, and is provided as a video stream to requesting entities. One or more requesting entities may request the media object 108 upon the media object 108 being exposed by the exposer component 106.

A receiver component 110 receives requests from multiple entities 112-114 that desire access to the media object 108, and thus the media stream 104, wherein the entities may be applications, hardware, users, and/or any suitable combination thereof. More specifically, the receiver component 110 may receive a first request from a first entity, a second request from a second entity, etc. The receiver component 110 may also receive and/or discern parameters related to each request. For example, the first entity 112 may be an application and may issue a request to access the exposed media object 108. When issuing the request, the first entity 112 may provide to the receiver component 110 an identity of the application, an identity of a user of the application, a desired resolution, a desired time duration of access, a desired frame rate, a desired compression, a desired encryption technique, a location of the application and/or user, a version number of the application, and/or other information. Moreover, the receiver component 110 may provide one or more of the entities 112-114 with status updates, such as indicating that the request has been denied or providing some other status information.

An access component 116 receives a subset of the parameters related to a request and determines whether the requesting entity is authorized to access the media object 108. In an example, the access component 116 can review a list of trusted applications to determine whether a requesting application is authorized to access the media object 108. More specifically, the access component 116 may receive an identity of the entity 112 and review a list of entities that are trusted. If the requesting entity 112 is not among the list of trusted entities, the access component 116 can deny the request for access to the media object 108 made by the entity 112. Of course, the access component 116 may use various other parameters when determining whether a requesting entity is authorized to access the media object 108, such as contextual data (e.g., time of day, day of week), a number of entities currently receiving a media stream (e.g., video stream) that originated from the video capture device 102, and the like. The access component 116 is described in greater detail below.

A splitter component 118 is in communication with the access component 116 and splits the media stream 104. Specifically, the splitter component 118 splits the media stream 104 such that each entity that is authorized to access the media object 108 receives a media stream. Thus, for example, multiple applications and/or users can receive video data captured by the media capture device 102. Pursuant to an example, the splitter component 118 may request receipt of the media stream 104 and may receive the media stream 104 upon issuing the request.

A policy component 120 applies one or more policies to at least one media stream, wherein the one or more policies are based at least in part upon the parameters related to the request. Thus, while not shown, the policy component 120 may receive request parameters from the receiver component 110. In another example, the request parameters may first be passed to the access component 116 and then provided to the policy component 120. In yet another example, the request parameters may first be provided to the access component 116, then passed to the splitter component 118, and then provided to the policy component 120. It is therefore to be understood that the policy component 120 may receive request parameters by way of any suitable manner.

Pursuant to an example, based upon an identity of an entity issuing a request for access to the media object 108, the policy component 120 can apply one or more policies to a media stream that is provided to the entity. Policies that can be applied by the policy component 120 include selection of resolution for a particular entity, selection of a resolution of the a video stream, selection of a frame rate of a media stream, selection of a compression format of a media stream, selection of a bit rate of a media stream, selection of an encryption method to use on the a media stream, adding metadata to a media stream, adding graphics that are to be displayed on a user interface, adding data that modifies data in a video stream, amongst other policies. The entities 112-114 that requested access to the media object 108 are therefore provided with media streams that are subject to policies that correspond to the entities. While the policy component 120 is illustrated and described as determining policies to apply to media streams as well as applying policies to apply to media streams, it is to be understood that separate threads of execution may be employed to determine policies to be applied to media streams and apply policies to media streams.

In a detailed example of operation of the system 100, the media capture device 102 can be a web cam, the first entity 112 may be a presence detection application (e.g., an application that detects presence of an individual in a region by analyzing content of video data), and the Nth entity 114 may be a video conferencing application. The webcam (media capture device 102) captures video frames and outputs such frames to create a video stream (media stream 104). The exposer component 106 exposes a video object (the media object 108) that is representative of a video stream (the media stream 104), wherein the first entity 112 and the Nth entity 114 may request access to the video object (and thus request a video stream from the webcam). The receiver component 110 receives a request for access to the video object from the presence detection application (the first entity 112) and also receives a request for access to the video object from the video conferencing application (the Nth entity 114). It is to be noted that the receiver component 110 need not receive the requests simultaneously. The receiver component 110 also receives data that identifies the entities 112 and 114.

The access component 116, in this example, grants access to the video object to the presence detection application and the video conferencing application. The splitter component 118 splits the video stream such that the presence detection application (the first entity 112) receives a first video stream and the video conferencing application (the Nth entity 114) receives a second video stream. Prior to the entities 112 and 114 receiving the video streams, the policy component 120 applies policies to at least one of the video streams provided to the entity 112 or the entity 114. For example, the presence detection application may operate optimally when it receives video with a relatively lower resolution while the video conferencing application may operate optimally when receiving video with a relatively higher resolution. The policy component 120 can thus independently provide policies to video streams that are received (at substantially the same time) by multiple entities, wherein the video streams originate from a single video capture device. For example, the policy component 120 can cause different media streams to have different resolutions, different media streams to have different frame rates, different media streams to have different compression formats, different media streams to be encrypted differently, different media streams to have different bit rates, and/or the like.

While the media capture device 102 is depicted as being separate from the exposer component 106, the receiver component 110, the access component 116, the splitter component 118, and the policy component 120, it is to be understood that one or more of such components may reside in the media capture device 102. In another embodiment, a computing device may include the aforementioned components, and the media capture device 102 may be in communication with the computing device by way of any suitable communications medium/protocol. For instance, the media capture device 102 may be connected to the computing device by way of a Universal Serial Bus. Other manners of connecting the media capture device 102 to the computing device, including wireless connection, are contemplated. In addition, in various embodiments, there may or may not be explicit divisions between the components described herein.

Figure 2:
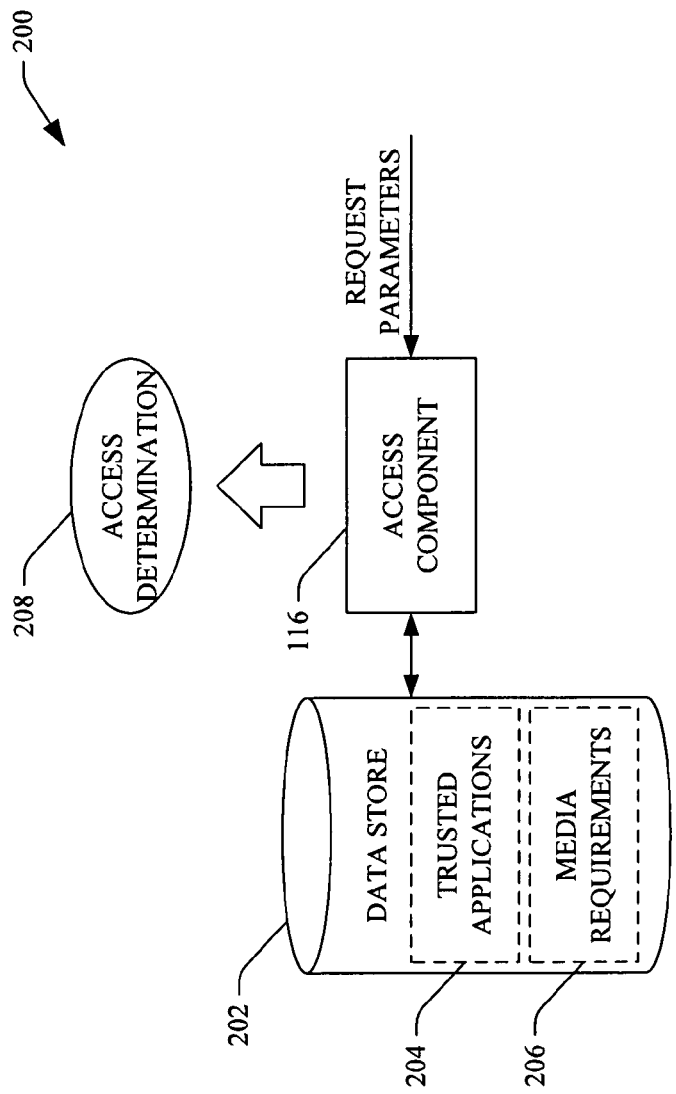
FIG. 2 is a functional block diagram of an example system that facilitates determining whether an entity is authorized to access a media stream.

Now referring to FIG. 2, an example system 200 that is provided to illustrate operation of the access component 116 is depicted. The access component 116 receives request parameters from an entity requesting access to the media object 108 (FIG. 1) and/or from another suitable entity. For instance, the request parameters may be or include an identity of an application, an identity of a user, a version number of an application, a current location of a requesting entity, information specifying a desired resolution of requested video, length of time that access to a video stream is desired, and/or other parameters.

The system 200 includes a data store 202 that is accessed by the access component 116. In an example, upon receiving the request parameters, the access component 116 can access the data store 202. The data store 202 may include a list of trusted applications 204 and media requirements 206. For example, the list of trusted applications 204 may include applications that an owner of the media capture device 102 has indicated are trusted and are authorized to receive a media stream created by the media capture device 102. In another example, the list of trusted applications 204 may include applications that are employed by a user that has been identified as being trusted to access the media stream 104 from the media capture device 102. The data store 202 additionally includes media requirements 206 that may correspond to entities requesting access to the media object 108. For example, a certain application may only be allowed access to the media object 108 if the application requests that a corresponding media stream be in black and white. If the application requests access to the media object 108 and indicates that the corresponding video stream is desirably received in color, then the access component 116 may deny the access request. Thus, for example, an application may be listed among trusted applications but may still be denied access to the media object 108.

In operation, the access component 116 receives request parameters (e.g., from a requesting entity). The access component 116 accesses the data store 202 and reviews the list of trusted applications 204 and the media requirements 206 and compares the content thereof with at least a portion of the request parameters. The access component 116 then outputs an access determination 208 based at least in part upon the comparison. More specifically, the access component 116 determines whether to allow a requesting entity access to the media object 108 or deny the requesting entity access to the media object 108 based at least in part upon the comparison.

Figure 3:
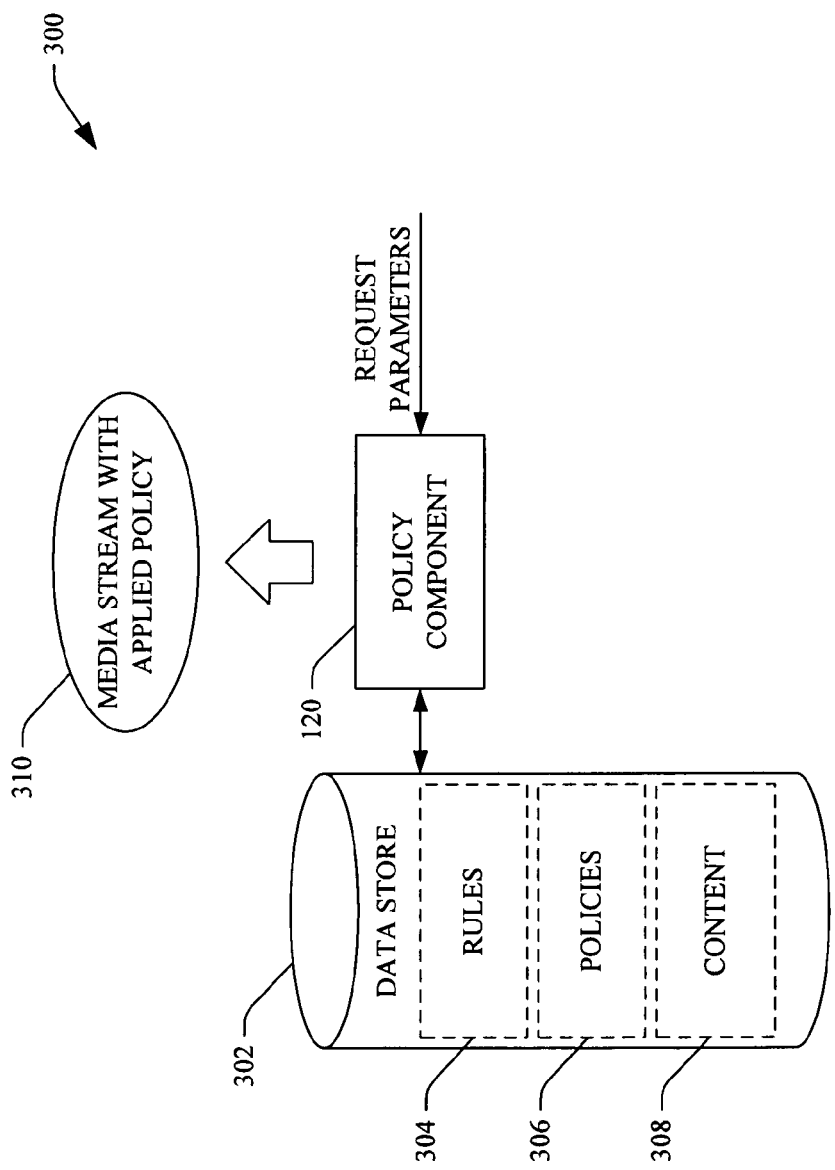
FIG. 3 is a functional block diagram of an example system that facilitates selectively applying one or more policies to one or more media streams.

With reference now to FIG. 3, an example system 300 is provided to illustrate operation of the policy component 120. The policy component 120 receives request parameters, which can be similar to the request parameters received by the access component 116 (described above). A data store 302 is accessible by the policy component 120, wherein the data store 302 may include rules, 304, policies 306, and content 308. The rules 304 may define which policy or policies are to be applied to a media stream (such as a video stream) for a requesting entity that corresponds to the request parameters. In an example, based upon an identity of an application, a certain rule in the rules 304 may be located and one or more policies may be applied based upon the located rule. In a specific example, based upon an identity of a requesting entity, a rule in the rules 304 may indicate that the requesting entity is to receive a video stream with a particular resolution. The policies 306 include code and/or data that are used to execute one or more located rules. Continuing with the above example, the policies 306 may include a policy (code) that causes a video stream to have a resolution indicated in a selected rule. In some instances, a policy may require that data be added to a media stream. For instance, metadata may be added to a video stream to cause a user interface to display a particular graphic, such as an advertisement. In another example, data may be added to a video stream such that video displayed to an end user is altered (e.g., data can be added that causes an advertisement to be placed over a portion of video, data can be added that causes a colored border to be placed over portions of video, . . . ). The content 308 may also include audio data and/or any other suitable data.

In operation, the policy component 120 receives request parameters and accesses the data store 302. The policy component 120 locates one or more rules in the rules 304 based at least in part upon a subset of the request parameters, and the located rule(s) specify one or more policies in the policies 306. The specified policy or policies may use a subset of the content 308 retained in the data store 302 to effectuate the specified policy. Accordingly, the policy component 120 outputs a media stream 310 with a policy applied thereto. While described as applying one or more policies to a single media stream that is provided to one requesting entity, it is to be understood that the policy component 120 may effectuate application of policies to multiple media streams (provided by the splitter component 118) in parallel.

Figure 4:
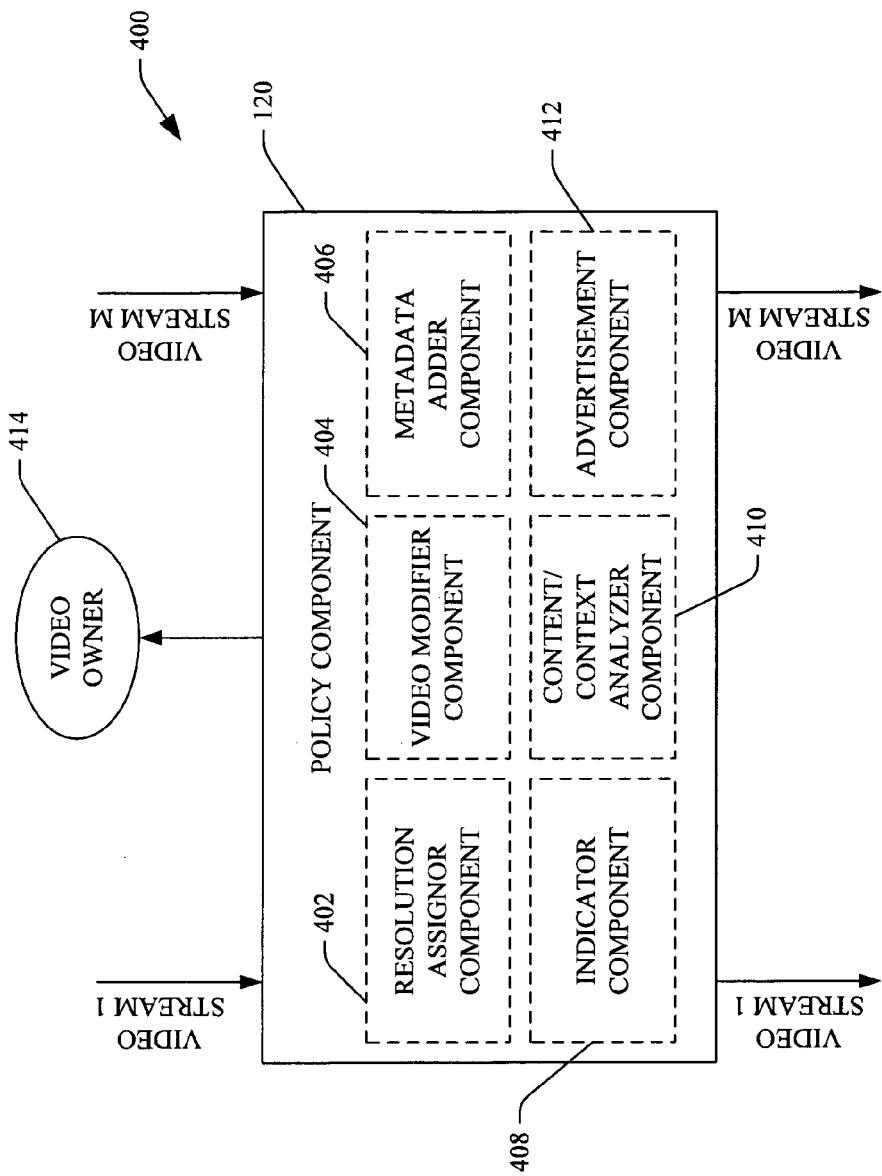
FIG. 4 is a functional block diagram of an example system that facilitates selectively applying one or more policies to one or more media streams.

Referring now to FIG. 4, an example of the policy component 120 is illustrated. Specifically, the policy component 120 is illustrated as including several example components. It is to be understood, however, that in some applications the policy component 120 may perform functions that may be represented by more or fewer components, and that the example components are provided for purposes of explanation.

The example policy component 120 includes a resolution assignor component 402, a video modifier component 404, a metadata adder component 406, an indicator component 408, a content/context analyzer component 410, and an advertisement component 412. The resolution assignor component 402 can individually modify resolution of video streams. For example, the resolution assignor component 402 can cause a first live video stream to have a first resolution and a second live video stream to have a second resolution, wherein the first and second video streams originate from a same video capture device.

The video modifier component 404 can individually modify video content of separate video streams. For instance, the video modifier component 404 can cause a first graphic to be displayed over content of a first video stream (when displayed to a first end user) and can cause a second graphic to be displayed over content of a second video stream (when displayed to a second end user).

The metadata adder component 406 can individually add metadata to video streams that are provided to different entities. The metadata assigned to a first video stream can cause a first graphical user interface displaying the first video stream to present a first graphic while metadata assigned to a second video stream can cause a second graphical user interface to displaying the second video stream to present a second graphic.

The indicator component 408 can provide an indication to a video owner 414 with respect to how many entities are currently receiving a video stream owned by the video owner 414, what types of entities are currently receiving a video stream owned by the video owner 414, when an entity requests access to a video stream owned by the video owner 414, and/or the like. The video owner 414 may be, for instance, an owner of video capture device, a person being videoed by the video capture device, a person monitoring the video capture device, a combination of two or more of the aforementioned owners, or another suitable entity. Since several people may be viewing video, privacy of the video owner 414 may be compromised. To aid in reducing privacy concerns, the indicator component 408 can provide an indication to the video owner 414 with respect to how many individuals/applications are receiving a video stream, identities of people/applications receiving the video stream, and/or the like.

The indicator component 408 may provide the aforementioned indication to the video owner 414 by way of any suitable means. For instance, the indicator component 408 may provide the video owner 414 with a graphical indication of how many people/applications are receiving a stream of video owned by the video owner 414. In another example, an audible alarm may be provided to the video owner 414. It is to be understood that any suitable manner for indicating to the video owner 414 that one or more applications/people are receiving a video stream owned by the video owner 414 is contemplated and intended to fall under the scope of the hereto-appended claims.

Still further, the indicator component 408 may provide indications to viewers of a video stream that are not owners thereof. Similar to what has been described above, the indications may include indications of how many applications/people are receiving the video stream, identities of people/applications viewing the video stream, and other suitable indications. These indications may be visual, audible, another sensory indication, or any suitable combination thereof. For instance, a particular color of a border may indicate that several people/applications are receiving a video stream. Similarly, the indicator component 408 can cause graphical icons to be displayed that indicate a number of applications/people receiving a video stream from a common video source. In another example, the indications may be embedded in metadata, such that entities that receive video data are tasked with providing information to users.

The content/context analyzer component 410 can analyze content of a video stream and provide such analysis to other components. For instance, the content/context analyzer component 410 can perform facial recognition to determine identities of individuals that are being captured by a video capture device. The content/context analyzer component 410 can further monitor voices (e.g., during a videoconference application) to determine stress levels, can perform audio recognition to recognize spoken words and/or an identity of a person speaking, etc. For instance, the content/context analyzer component 410 can recognize that an individual captured by a video capture device speaks a particular word, and can automatically initiate a search for that word. Moreover, the content/context analyzer component 410 can facilitate automated performance of actions based on audible or visual commands that are captured by an audio/video capture device.

The advertisement component 412 can automatically provide advertisements to users that are receiving a video stream. The advertisement component 412, for instance, can provide customized advertisements based upon identity of a person, an identity of an application being used to receive a live video stream, contextual information (time of day, day of week, etc.), and/or the like. Further, the advertisement may provide advertisements based at least in part upon an analysis performed by the content/context analyzer component 410. For instance, if the content/context analyzer component 410 recognizes that a videoconference relates to updating an information technology infrastructure, the content/context analyzer component 410 can provide such information to the advertisement component 412. The advertisement component 412 may use such information to provide a person that is receiving a video stream with an advertisement of a computer manufacturer, for instance.

Figure 5:
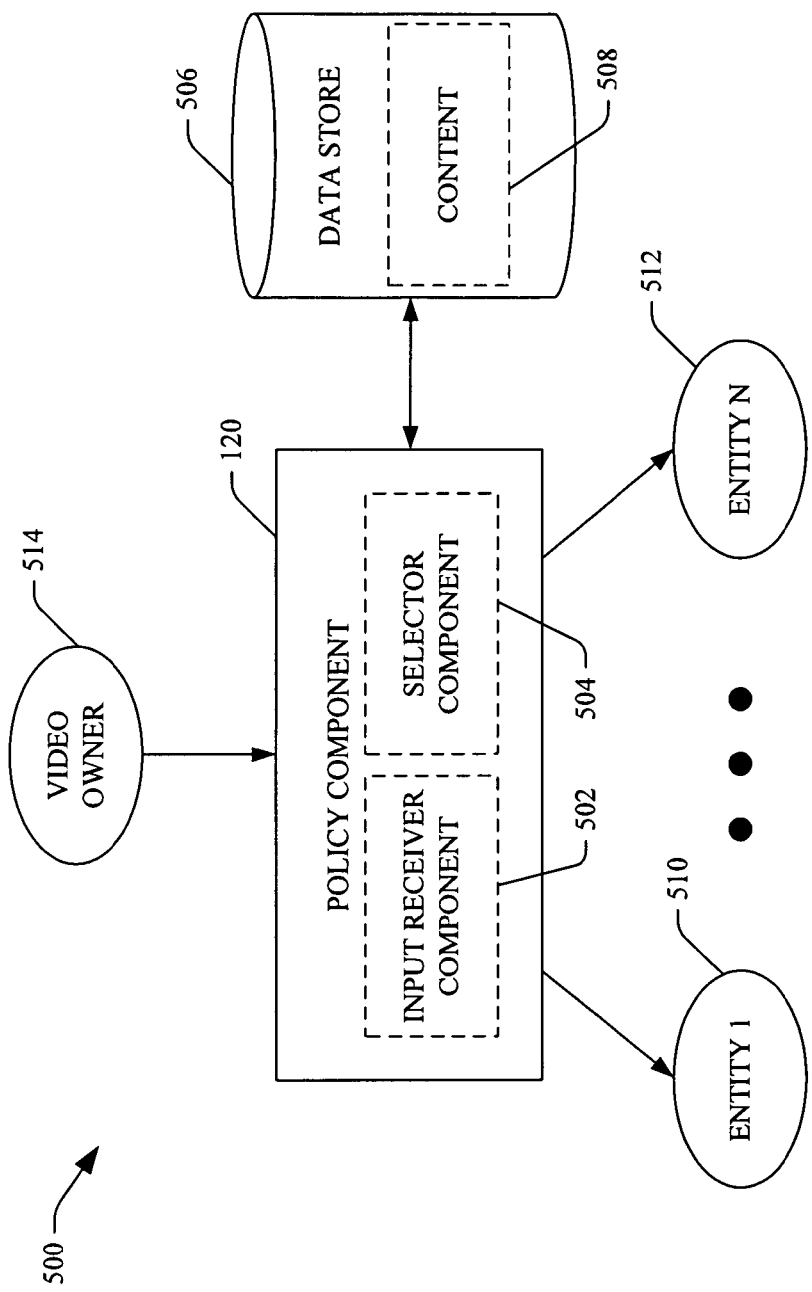
FIG. 5 is a functional block diagram of an example system that facilitates selectively providing a media stream to requesting entity.

Now turning to FIG. 5, an example system 500 provided to illustrate an embodiment is depicted. The system 500 includes the policy component 120, which includes an input receiver component 502 and a selector component 504. The system 500 additionally includes a data store 506 that retains media content 508.

In the embodiment, multiple entities 510-512 have requested access to a video stream owned by a video owner 514. The video owner 514, however, may wish to provide access to a video stream first to the first entity 510 and later to the Nth entity 512. For instance, the video owner 514 may be providing customer support by way of a videoconference, such that the video owner 514 is providing support to the first entity for a first issue and is providing support to the Nth entity 512 for a second issue. Thus, the first entity 510 will not need to receive a video stream relating to the issue of the Nth entity 512, and vice versa.

In operation, the first entity 510 is receiving a live video stream from the video owner 514, and the Nth entity 512 has requested to receive a live video stream from the video owner. While the Nth entity 512 is not receiving the video stream, the selector component 504 can select content 508 from the data store 506 to provide to the Nth entity 512. For instance, the selector component 504 can provide advertisements to the Nth entity 512. At some point, the video owner 514 may wish to communicate with the Nth entity 512 (e.g., allow the Nth entity to receive a live video stream from the video owner 514) and not communicate with the first entity 510. The video owner 514, however, may not wish to totally disconnect from the first entity 510. The input receiver component 502 can receive an indication from the video owner 514 that the first entity 510 is to be placed on "hold" and that the Nth entity 512 is to receive a video stream from the video owner 514. For example, the video owner 514 may depress a "hot key" on a computer keypad, and the input receiver component 502 can detect depression of the "hot key". The policy component 120 can then provide access to the video stream to the Nth entity 512, and the selector component 504 can select content 508 from the data store 506 to provide to the first entity 510. As can be discerned from the above, the video owner 514 can select which of multiple entities are to receive a live video stream at any particular point in time, while providing other entities with different content until the video owner 514 desires to allow the other entities to receive the live video stream.

Figure 6:
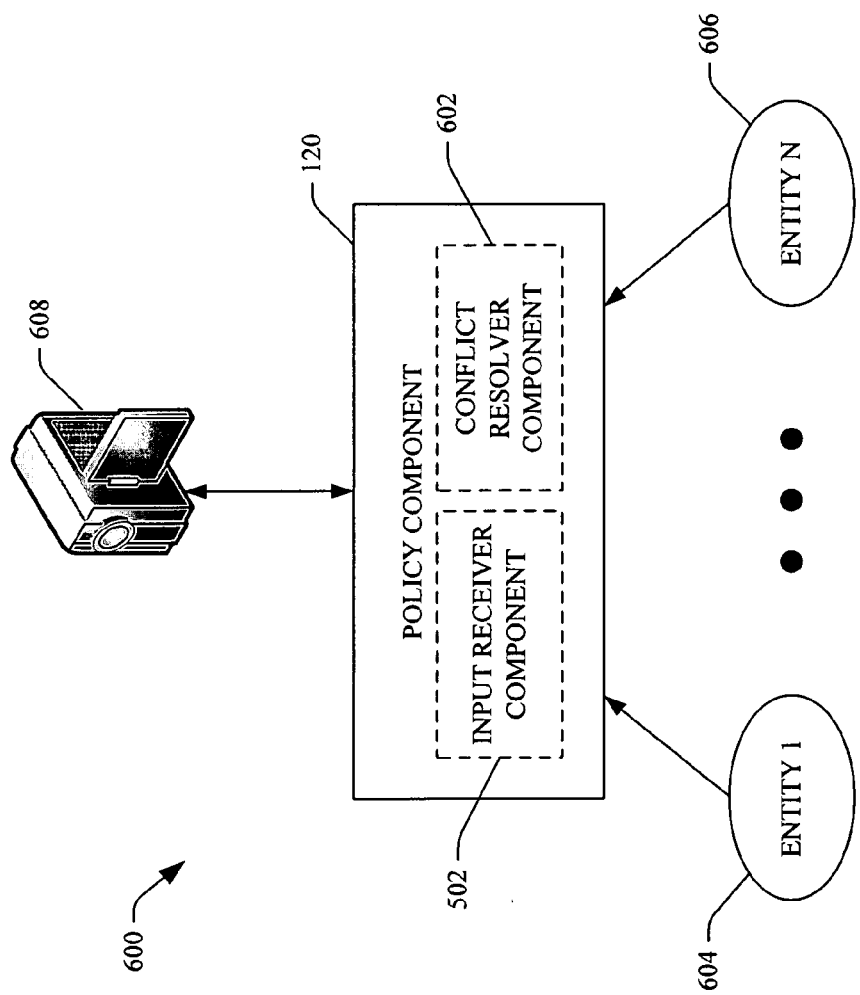
FIG. 6 is a functional block diagram of a system that facilitates altering a parameter of a media capture device.

Turning now to FIG. 6, an example system 600 that is presented to depict an embodiment is illustrated. The system 600 includes the policy component 120, which includes the input receiver component 502 and a conflict resolver component 602. In this example, the input receiver component 502 is configured to receive input from one or more entities 604-606.

In some instances, an entity receiving a live video stream that originates at a video capture device 608 may wish to alter parameters of the video capture device 608. For example, the entity 604 may wish to alter the zoom of the video capture device 608, and may generate a request to change the zoom that is received by the policy component 120. The input receiver component 502 receives the request and the conflict resolver component 602 determines whether, in this example, to cause the zoom of the video capture device 608 to be altered. For instance, the Nth entity 606 may have priority over the zoom function, and thus the first entity 604 is not authorized to alter the zoom of the video capture device 608. The conflict resolver component 602 resolves conflicts relating to which entities have control over certain parameters of the video capture device 608 in particular situations, as well as resolves conflicts if no set rule is established with respect to which entity is authorized to control a certain parameter in a certain situation. For example, the conflict resolver component 602 may use a "first in time" approach to resolve conflicts, wherein a first entity in time to request a change in a parameter of the video capture device 608 receives priority to make such change.

Figure 7:
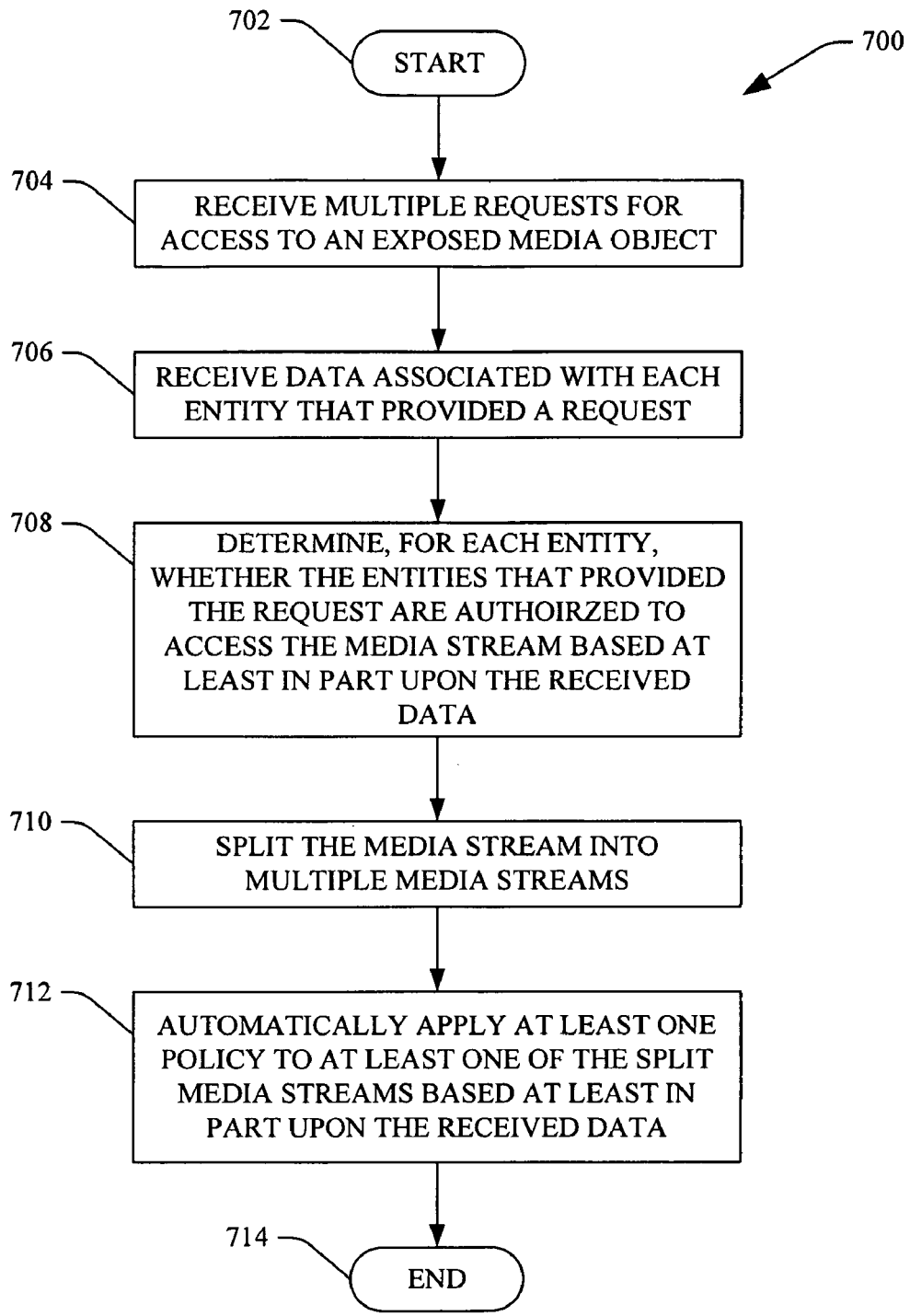
FIG. 7 is a flow diagram that illustrates an example methodology for applying at least one policy to a media stream.
Figure 8:
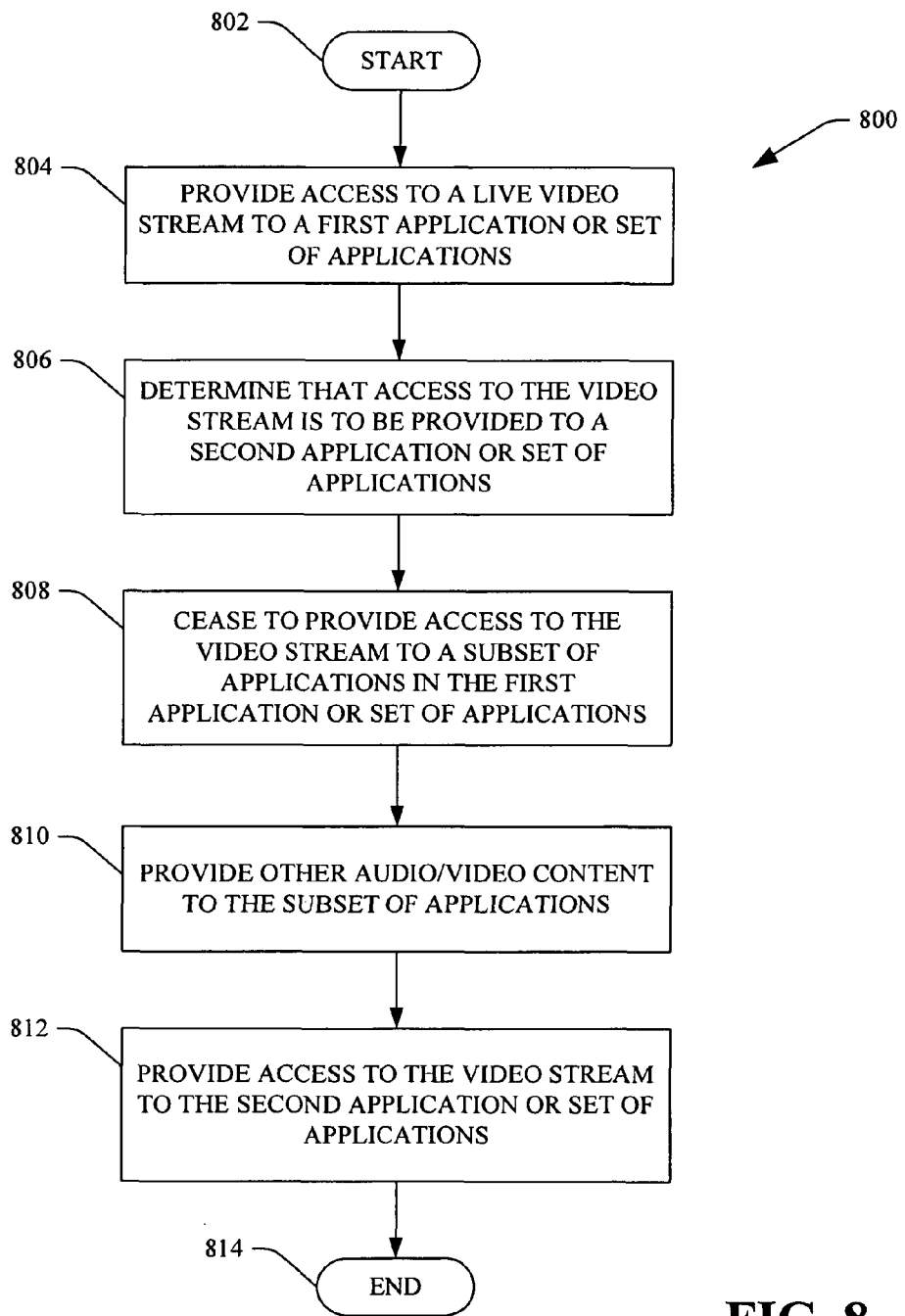
FIG. 8 is a flow diagram that illustrates an example methodology for selectively providing access to a media stream.
Figure 9:
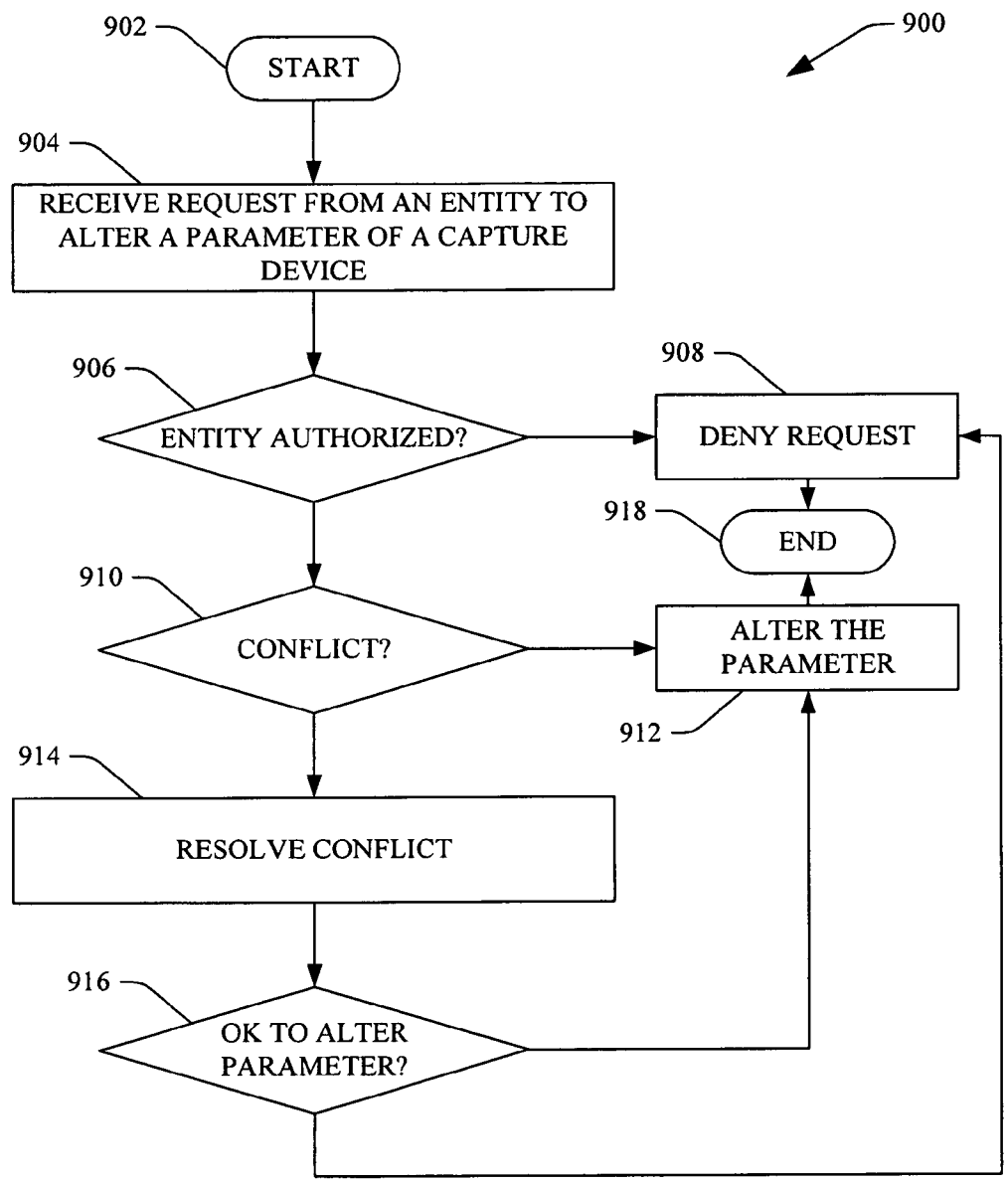
FIG. 9 illustrates a flow diagram that illustrates an example methodology for altering a parameter of a media capture device.

With reference now to FIGS. 7-9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like.

Referring specifically to FIG. 7, an example methodology 700 for applying at least one policy to one of several media streams that originate from a common media capture device is illustrated. The methodology 700 starts at 702, and at 704 multiple requests for access to an exposed media object are received, wherein the exposed media object represents a media stream that is being generated by a video capture device. At 706, data associated with each entity that provided a request is received.

At 708, a determination is made, for each entity, regarding whether the entities that provided the requests are authorized to access the media stream based at least in part upon the data received at 706. At 710, the media stream is split into multiple media streams, wherein a number of media streams corresponds to a number of authorized entities. In other words, each authorized entity that provided a request will receive a media stream that originates from a common video capture device. At 712, at least one policy is automatically applied to at least one of the split media streams based at least in part upon the received data. Several example policies have been described above. The methodology 700 completes at 714.

Turning now to FIG. 8, an example methodology 800 is illustrated. The methodology 800 starts at 802, and at 804 access is provided to a live video stream to a first application or set of applications. At 806, a determination is made that access to the video stream is to be provided to a second application or set of applications. It is to be understood that the second set of applications may include a subset of the applications in the first set of applications.

At 808, access to the video stream to a subset of applications in the first application or set of applications is ceased. At 810, other audio/video content is provided to the aforementioned subset. At 812, access to the video stream is provided to the second application or set of applications. It is to be understood that the second set of applications may include one or more applications in the first set of applications. These common applications may continue to receive the video stream without substantial interruption. The methodology 800 completes at 814.

With reference now to FIG. 9, an example methodology 900 is illustrated. The methodology 900 starts at 902, and at 904 a request is received from an entity to alter a parameter of a capture device (e.g., an audio or video capture device, such as a webcam). At 906, a determination is made regarding whether the entity is authorized to alter the parameter. Such authorization can be based at least in part upon an identity of the entity, a time of day, a day of week, an identity of a user using the entity, a version number of an application, or any other suitable information. If the entity is not authorized to alter the parameter, the request received at 904 is denied at 908.

If it is determined at 906 that the entity is authorized to alter the parameter, at 910 a determination is made regarding whether any conflicts exist. For instance, a different entity may be receiving a video stream from the capture device, and thus a conflict may exist with respect to altering a parameter of the capture device. If it is determined that there are no conflicts, then the parameter is altered at 912. If there is a conflict, then at 914 the conflict is resolved. Any suitable manner for resolving conflicts between two or more entities with respect to one or more parameters of the capture device is contemplated and intended to fall under the scope of the hereto-appended claims.

At 916 a determination is made regarding whether the parameter can be modified, wherein the determination is made based at least in part upon how the conflict was resolved at 914. If the parameter can be modified, the parameter is modified at 914. If the parameter cannot be modified, the request is denied at 908. The methodology 900 ends at 918.

Figure 10:
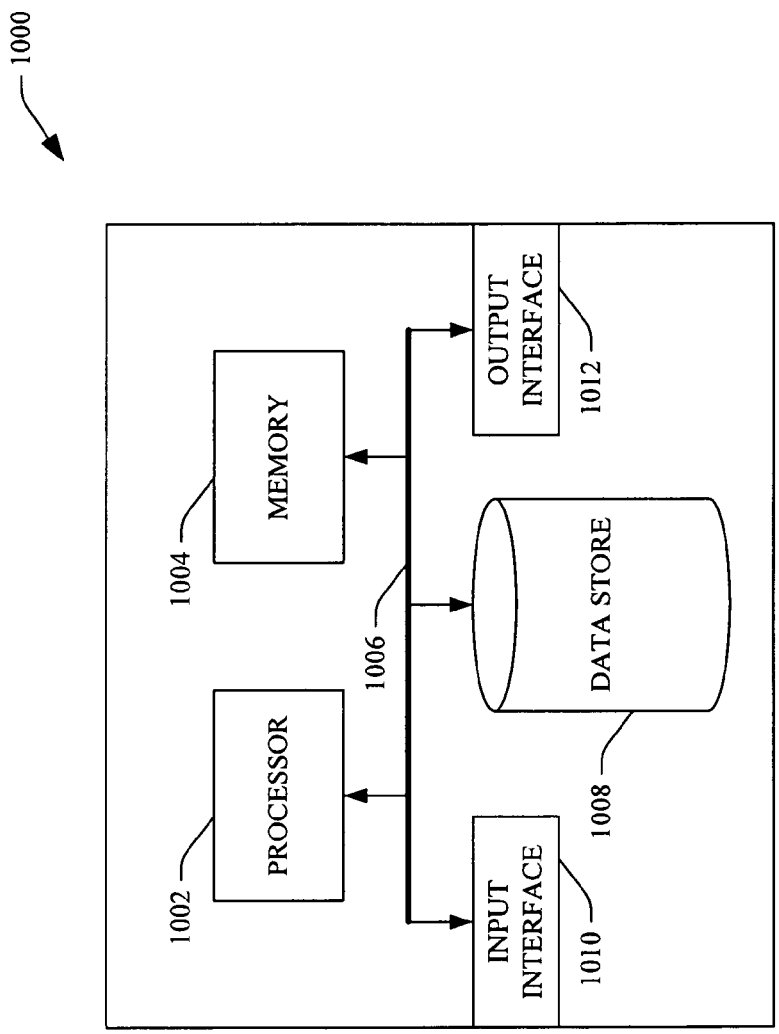
FIG. 10 is an example computing system.

Now referring to FIG. 10, a high-level illustration of an example computing device 1000 that can be used in accordance with the systems and methodologies disclosed herein is illustrated. For instance, the computing device 1000 may be coupled to an audio/video capture device and retain an audio/video management system. In another example, the computing device 1000 may be an audio/video capture device. The computing device 1000 may also be a server, or may be employed in devices that are conventionally thought of as client devices, such as personal computers, personal digital assistants, and the like. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory by way of a system bus 1006. In addition to storing executable instructions, the memory 1004 may also store a list of trusted applications, policies, rules, and the like.

The computing device 1000 additionally includes a data store 1008 that is accessible by the processor 1002 by way of the system bus 1006. The data store 1008 may include executable instructions, a list of trusted applications, a list of trusted users, etc. The computing device 1000 also includes an input interface 1010 that allows external devices to communicate with the computing device 1000. For instance, the input interface 1010 may be used to receive information from a user. In another example, the input interface may be a port that receives a video stream from a video capture device, such as a webcam, wherein the port may be a serial port such as a Universal Serial Bus port. The computing device 1000 also includes an output interface 1012 that interfaces the computing device 1000 with one or more external devices. For example, the computing device 1000 may display a video stream by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
    configuring a processor to perform functions comprising:
        receiving multiple requests from multiple different computer-executable applications for access to an exposed media object, wherein the exposed media object represents a media stream that is being generated by a media source;
        receiving data associated with each computer-executable application that provided a request;
        determining, for each computer-executable application, whether the computer-executable application that provided the request is authorized to access the media stream based at least in part upon the received data;
        splitting the media stream into multiple media streams, wherein a number of media streams corresponds to a number of authorized computer-executable applications;
        automatically applying at least one policy to at least one of the split media streams based at least in part upon the received data; and
        indicating, to a user of the media source, how many computer-executable applications are currently receiving media streams that originate from the media source.

2. The method of claim 1, the functions further comprising providing the split media streams to the authorized computer-executable applications.

3. The method of claim 1, wherein the at least one applied policy is based at least in part upon an identity of an application corresponding to the at least one media stream.

4. The method of claim 1, wherein the applied policy is based at least in part upon an identity of a user of an application corresponding to the at least one media stream.

5. The method of claim 1, wherein applying the at least one policy comprises one or more of selecting a resolution of the at least one media stream, selecting a frame rate of the at least one media stream, selecting a compression format of the at least one media stream, or selecting an encryption method to use on the at least one media stream.

6. The method of claim 1, wherein the media stream is a live video stream.

7. The method of claim 1, wherein the media source is one of a webcam or a microphone.

8. The method of claim 1, the functions further comprising:
    providing access to the media stream to a first application or set of applications;
    receiving an indication that access to the media stream is to be provided to a second application or set of applications;
    ceasing to provide access to the media stream to a subset of applications in the first application or set of applications;
    providing other media content to the subset of applications; and
    providing access to the media stream to the second application or set of applications.

9. The method of claim 1, wherein the media stream is a live video stream, wherein a first computer-executable application that is authorized to access the live video stream is authorized to receive the live video stream at a first resolution, and wherein a second computer-executable application that is authorized to access the live video stream is authorized to receive the live video stream at a second resolution that is higher than the first resolution, and further comprising:
    transmitting the live video feed at the first resolution to the first computer-executable application; and
    transmitting the live video feed at the second resolution to the second computer-executable application.

10. The method of claim 1, the data associated with a computer-executable application that provided a request comprises an identity of the computer-executable application, an identity of a user of the computer-executable application, and a time duration for which access to the media stream is desired.

11. The method of claim 1, wherein the media stream is a video stream, and further comprising selectively applying metadata to at least one split media stream that is to be provided to a certain computer-executable application, the metadata being an a graphical advertisement that is to be displayed over a portion of the at least one split media stream.

12. A media management system, comprising:
a processor; and
a memory that comprises a plurality of components that are executable by the processor, the components comprising:
   an exposer component that exposes a media object, wherein the media object represents a media stream generated by a media source;
   a receiver component that receives multiple requests to access the media object from multiple computer-executable applications;
   a splitter component that splits the media stream into multiple media streams;
   a policy component that automatically applies at least one policy to at least one of the multiple media streams; and
   an indicator component that informs the owner of the media source of how many applications or users are currently receiving media streams that originate from the media source.

13. The system of claim 12, further comprising an access component that determines whether an entity that requests access to the media object is authorized to access the media object.

14. The system of claim 13, wherein the access component reviews a list of trusted applications to determine whether the computer-executable applications are authorized to access the media object.

15. The system of claim 12, wherein the policy component causes at least one of the following:
   different ones of the media streams to have different resolutions;
   different ones of the media streams to have different frame rates; or
   different ones of the media streams to have different bit rates.

16. The system of claim 12, wherein the policy component adds metadata to at least one media stream.

17. The system of claim 12, wherein the policy component modifies data in media stream provided to a requestor of the media object.

18. The system of claim 12, wherein the multiple computer-executable applications request simultaneous access to the media object.

19. The system of claim 18, wherein the multiple computer-executable applications comprise a video chat application and a motion detection application.

20. A computer-readable data storage device comprising instructions that, when executed by a processor, cause the processor to perform acts comprising:
   receiving requests from several different computer-executable applications to access an exposed media object, wherein the media object represents a live video stream being generated by a video camera;
   splitting the live video stream into multiple live video streams in response to the requests;
   automatically applying policies to the live video streams that indicate that the different computer-executable applications are to be provided with the live video streams in different video resolutions;
   providing the live video streams to the requesting computer-executable applications in accordance with the policies; and
   indicating how many computer-executable applications are currently receiving video streams that originate from the video camera.

* * * * *